United States Patent
Hirao et al.

[11] Patent Number: 5,968,426
[45] Date of Patent: Oct. 19, 1999

[54] METHOD OF PRODUCING POROUS SILICON NITRIDE CERAMICS HAVING HIGH STRENGTH AND LOW THERMAL CONDUCTIVITY

[75] Inventors: Kiyoshi Hirao; Manuel E. Brito; Motohiro Toriyama; Syuzo Kanzaki; Hisayuki Imamura; Takene Hirai; Yasuhiro Shigegaki, all of Aichi, Japan

[73] Assignees: Japan as represented by Director General of Agency of Industrial Science and Technology; Fine Ceramics Research Association, both of Tokyo, Japan

[21] Appl. No.: 08/787,019

[22] Filed: Jan. 29, 1997

[30] Foreign Application Priority Data

Jan. 30, 1996 [JP] Japan .................................. 8-035545

[51] Int. Cl.$^6$ ......................... C04B 34/584; C04B 38/00
[52] U.S. Cl. ......................... 264/43; 264/628; 264/638; 264/639; 264/650; 264/683
[58] Field of Search ............................. 264/43, 628, 683, 264/638, 639, 650

[56] References Cited

U.S. PATENT DOCUMENTS

| | | | |
|---|---|---|---|
| 4,388,255 | 6/1983 | Simpson | 264/43 |
| 4,603,116 | 7/1986 | Smith | 264/683 |
| 4,886,767 | 12/1989 | Goto et al. | 264/60 |
| 5,603,877 | 2/1997 | Kato et al. | 264/683 |
| 5,674,793 | 10/1997 | Hirao et al. | 501/97 |

OTHER PUBLICATIONS

Mitomo et al., "The Strength of Alpha–Sialon Ceramics," Journal of Materials Science 15, (1980), pp. 2661–2662.
Kita et al., Decrease in Thermal Conductivity of Reaction–Bonded $Si_3N_4$ by Addition of Binary Compounds (Part 2), Journal of the Ceramic Society of Japan, 102, pp. 598–602.
Nielsen, "Strength and Stiffness of Porous Materials," J. Am. Ceram. Soc., 73 [9], 1990, pp. 2684–2689.
Hirao et al., "Preparation of Rod–Like Beta–$Si_3N_4$ Single Crystal Particles," Journal of the Ceramic Society of Japan, 101 [9], 1993, pp. 1078–1080.

*Primary Examiner*—James Derrington
*Attorney, Agent, or Firm*—Oblon, Spivak, McClelland, Maier & Neustadt, P.C.

[57] ABSTRACT

The present invention relates to a method for producing a porous silicon nitride sintered body having high strength and low thermal conductivity, which comprises of adding more than 10 volume % of rodlike beta-silicon nitride single crystals with a larger mean diameter than that of a silicon nitride raw powder into a mixture comprising the silicon nitride raw powder and a sintering additive, preparing a formed body with rodlike beta-silicon nitride single crystals oriented parallel to the casting plane according to a forming technique such as sheet casting and extrusion forming, sintering said formed body to develop elongated silicon nitride grains from the added rodlike beta-silicon nitride single crystals as nuclei and obtain the sintered body with the elongated grains being dispersed in a complicated state.

2 Claims, 2 Drawing Sheets

METHOD OF PRODUCING POROUS SILICON NITRIDE CERAMICS HAVING HIGH STRENGTH AND LOW THERMAL CONDUCTIVITY

DESCRIPTION OF THE INVENTION

The present invention relates to porous silicon nitride ceramics having low thermal conductivity, which have high strength in a specific direction and have low thermal conductivity caused by fine pores uniformly dispersed therein, and a method for production thereof.

The porous silicon nitride ceramics having low thermal conductivity of the present invention are useful as a high-temperature heat insulating component requiring high strength, for example, as a material for heat-shielding engine parts and diesel engine parts.

BACKGROUND OF THE INVENTION

Generally, examples of a high-temperature heat insulating component having high strength include the following techniques.

(1) Thermal spraying of ceramics onto the surface of a metal matrix (e.g., official gazette of Laid-Open Japanese Patent Publication No. 61-169241)

The object of this technique lies in improving heat resistance and heat insulating properties by thermal-spraying ceramics onto the surface of the metal matrix; however, there exist problems to be dissolved such as problems of poor strength of a thermal-sprayed film itself, release between a metal matrix and the thermal-sprayed film and complicated processes needed.

(2) Making components from ceramics (I)—Application of silicon nitride ceramics (e.g., Journal of Materials Science, Vol. 15, p. 2661 (1980))

The object of this technique lies in accomplishing high strength and heat resistance of the components; high strength of them has been accomplished (about 1 GPa), but there exists a problem of not so lowered thermal conductivity (about 30 to 40 W/mK).

(3) Making components from ceramics (II)—Addition of a second component in the reaction sintering of Si (e.g., J. Ceram. Soc. Jpn., 102 [6], pp. 598–602 (1994))

The object of this technique lies in making silicon nitride ceramics having low thermal conductivity; lowering of the thermal conductivity of them has been accomplished (2 to 4 W/mK), but there exists a problem of not so high strength (about 200 MPa), which should be dissolved.

Here, further looking over prior arts related to silicon nitride ceramics, silicon nitride has strong covalent bonding properties and excellent stability at a high temperature as compared with oxide ceramics; and hence, the silicon nitride has been developed as a high-temperature structural material, and it has begun to be used as a part for engine including an automobile turbo-charger recently. Though conventional silicon nitride ceramics having high strength have succeeded in obtaining high strength, thermal conductivity thereof is comparatively high as 30 to 40 W/mK, as described above, and hence they have failed to be used as a heat insulating structural component as yet.

Generally, it is effective for lowering thermal conductivity of ceramics to disperse pores therein. It is known, however, that if pores are dispersed in a matrix composed of isotropic particles, strength of them are lowered fairly. For example, according to J. Am. Ceram. Soc., 73 [9], pp. 2684–89 (1990)), presence of 10% of pores in the matrix lowers strength of them by about 40%.

As described above, it has been hard to prepare a material having both high strength and low thermal conductivity according to prior techniques. It is the object of the present invention to provide porous silicon nitride ceramics having high strength and low thermal conductivity and a method for production thereof.

The present inventors have engaged in studies about controlling the microstructure of silicon nitride ceramics prior to the present invention, and as a result have found that a sintered body having a microstructure with large elongated grains developed from seed crystals as nuclei oriented parallel to the casting plane is obtained by adding a small amount of single crystal beta-silicon nitride rodlike particles into a raw powder as seed crystals and sintering a formed body with seed crystals oriented by a sheet-casting technique, and that the sintered body has both high strength and high toughness in the direction vertical to the orientation direction, and has filed a patent application (Japanese Patent Application No. 6-336177/1994). Moreover, as a result of further performing the studies, the present inventors have found that, in the case of increasing the amount of seed crystals to be added, a porous sintered body with large elongated grains being complicated, developed from seed crystals and having a microstructure with fine pores sealed among the elongated grains can be obtained, having pores being introduced without lowering strength of them; that is, the present inventors have succeeded in developing a technique of introducing pores into a microstructure of silicon nitride ceramics, while maintaining the high strength of them, which has led to the accomplishment of the present invention of a porous silicon nitride sintered body having both high strength and low thermal conductivity.

SUMMARY OF THE INVENTION

The present invention relates to a method for producing a porous silicon nitride sintered body having high strength and low thermal conductivity, which comprises of adding more than 10 volume % of rodlike beta-silicon nitride single crystals with a larger mean diameter than a silicon nitride raw powder into a mixture comprising a silicon nitride raw powder and a sintering additive, preparing a formed body with rodlike beta-silicon nitride single crystals oriented parallel to the casting plane according to a forming technique such as sheet casting and extrusion forming, sintering said formed body to develop elongated silicon nitride grains from the added rodlike beta-silicon nitride single crystals as nuclei and obtain the sintered body with elongated grains being dispersed in a complicated state.

A silicon nitride sintered body prepared according to the present invention exhibits high strength; since it has a microstructure with large elongated grains oriented parallel to the casting plane and complicated and spherical pores hardly coming into contact with one another, it has high strength of more than 700 MPa in the direction vertical to the orientation direction of the grains even though it has a theoretical density of less than 85%.

Besides, low thermal conductivity of the body is realized and thermal conductivity of it is lowered by the introduction of more than 15% of pores. It is possible to further lower the thermal conductivity of it by dissolving alumina into silicon nitride as a matrix to make a sialon.

Moreover, porous silicon nitride ceramics having low thermal conductivity according to the present invention are useful as a high-temperature heat insulating component, for example, as a material for heat-shielding engine parts and diesel engine parts.

Figure 1:
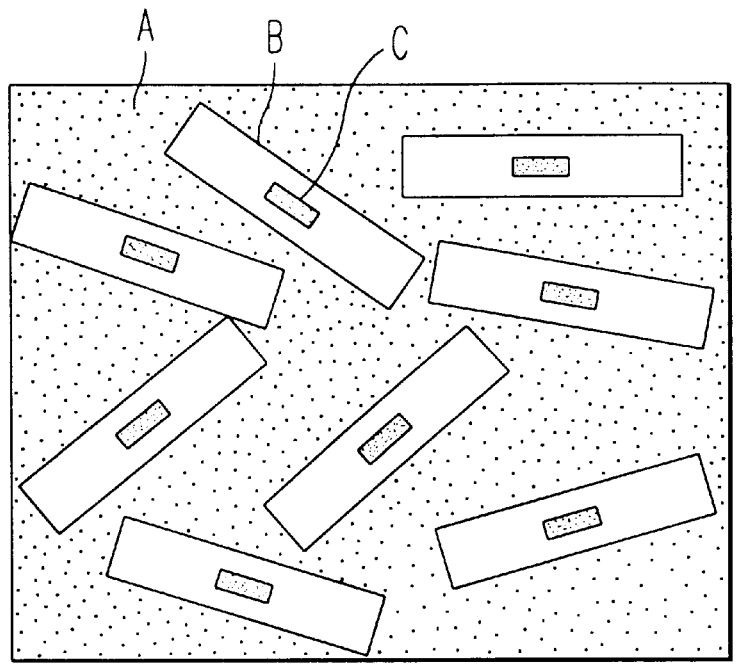
FIG. 1 shows a schematic view of the microstructure of a silicon nitride sintered body having high strength and high toughness (Comparative Example).

EXPLANATION OF THE SYMBOLS a: Fine silicon nitride matrix
b: Large elongated grains (developed from c)
c: Rodlike beta-silicon nitride single crystals
d: Pores

DETAILED DESCRIPTION OF THE INVENTION

That is, the present invention relates to a method for producing a porous silicon nitride sintered body having high strength and low thermal conductivity, which comprises of adding more than 10 volume % of rodlike beta-silicon nitride single crystals with a larger mean diameter than that of a silicon nitride raw powder into a mixture comprising the silicon nitride raw powder and a sintering additive, preparing a formed body with rodlike beta-silicon nitride single crystals oriented parallel to the casting plane according to a forming technique such as sheet casting and extrusion forming, sintering said formed body to develop elongated silicon nitride grains from the added rodlike beta-silicon nitride single crystals as nuclei and obtain the sintered body with the elongated grains being dispersed in a complicated state.

Moreover, the present invention relates to the porous silicon nitride sintered body having high strength and low thermal conductivity obtained by the above method for production, which has a relative density of 70 to 90% and a microstructure with elongated grains being complicated.

Hereunder, the present invention will be described in more detail.

The basic constitution of the process of the production of a porous silicon nitride sintered body having high strength and low thermal conductivity according to the present invention is as follows. Besides, specific constitution including the amount of seed crystals (rodlike beta-silicon nitride single crystals) to be added will be described later.

(1) A mixed powder is prepared by adding a sintering additive and rodlike beta-silicon nitride single crystals (preferably more than 10 volume %) into a silicon nitride raw powder.

(2) A formed body with rodlike beta-silicon nitride single crystal particles oriented parallel to the casting plane is prepared by sheet casting or extrusion forming.

(3) The obtained formed body is sintered.

In order to prepare a porous silicon nitride sintered body having high strength and low thermal conductivity according to the present invention, firstly, a prescribed amount of a sintering additive is added into a silicon nitride raw powder. As a silicon nitride material may be employed alpha-type, beta-type and amorphous crystal materials; it is desirable to employ a fine powder with an average particle diameter of less than 0.5 μm. As a sintering additive can be employed those generally used such as MgO, CaO, $Al_2O_3$, $Y_2O_3$, $Yb_2O_3$, $HfO_2$, $SC_2O_3$, $CeO_2$, $ZrO_2$, $SiO_2$, $Cr_2O_3$ and AlN.

The combination of these sintering additives and the amount thereof to be added vary according to sintering conditions including sintering temperature, sintering time and nitrogen gas pressure in sintering; each of these conditions is selected so that (1) the relative density of a specimen should be from 70 to 90%, and that (2) a microstructure with elongated grains being complicated developed from seed crystals should be obtained. If the relative density of a specimen is less than 70%, pores in the product are connected with one another and strength of them is lowered remarkably. On the other hand, if the relative density of them is more than 90%, the lowering rate of thermal conductivity of them is small. In addition, with a view to obtaining silicon nitrides having a microstructure with elongated grains developed anisotropically and complicated in sintering, a sintering additive containing a rare earth oxide such as $Y_2O_3$. and $Yb_2O_3$ is used preferably. Sintering additives containing AlN can develop a beta-sialon ($Sic_{6-z}Al_zO_zN_{8-z}$, z=0 to 4.2) having low thermal conductivity from seed crystals, which can make a material have lower thermal conductivity.

In mixing these materials, an ordinary machine employed for mixing or kneading a powder can be used. The mixing may be performed according to a wet method or a dry method; preferably it is performed according to the wet method. In wet mixing, solvents such as water, methanol, ethanol and toluene are used, and an organic solvent is used preferably with a view to controlling the oxidation of silicon nitride. In the case of using an organic solvent, the mixing can be performed more effectively by employing a dispersing agent such as sorbitan monooleate and the like.

Next, more than 10 volume %, preferably 15 volume % of rodlike beta-silicon nitride single crystals are added to the thus obtained mixed powder as seed crystals.

If the amount of seed crystals to be added is less than 10 volume %, it is too small; hence a sintered body obtained is dense and has a microstructure with large elongated grains developed from seed crystals as nuclei oriented and dispersed in fine silicon nitride matrix particles parallel to the casting plane but can neither be highly densified nor has low thermal conductivity. If the amount thereof to be added is more than 10 volume %, large elongated grains come into contact with one another in sintering, and the region surrounded with large grains is prevented from being densified and this part becomes pores finally, thereby accomplishing a porous product having low thermal conductivity. Hence, the amount of seed crystals to be added is determined to more than 10 volume %. It is also desirable that seed crystals have a larger average particle size than that of a silicon nitride raw powder to be used and an aspect ratio of more than 2. If the mean diameter of seed crystals is smaller than the average particle diameter of the powder, they dissolve into the additive during sintering and fail to play the role of seed crystals. On the other hand, if the aspect ratio of seed crystals is less than 2, they cannot be oriented parallel to the casting plane in sheet casting and the like, and hence a product will have a microstructure with elongated grains developed from seed crystals dispersed at random and the strength thereof will be lowered remarkably.

As rodlike beta-silicon nitride single crystals to be employed as seed crystals can be used commercially available beta-silicon nitride whiskers; however, they are not uniform in size and contain a lot of lattice defects and impurities, and hence it is preferable to employ, for example, rodlike beta-silicon nitride single crystals with a high purity and a uniform size prepared according to the technique reported in J. Ceram. Soc. Jpn., 101 [9], pp. 1071–73 (1993)). In adding seed crystals to a raw powder, it is important to add the seed crystals into a slurry obtained by mixing a silicon nitride material and a sintering additive according to the above wet mixing sufficiently by a technique such as ultrasound dispersion and pot mixing employing a resin pot and a resin coat ball as not to destroy seed crystals.

Next, a proper amount of an organic binder is added to and mixed with the thus obtained mixed slurry, and then the mixture is formed into a formed body employing sheet casting according to the doctor-blade method or extrusion forming to orient seed crystals. In particular, in the case of sheet casting, after the casting, sheets are stacked under heat-pressure to obtain sheets with a prescribed thickness.

Next, the above formed body is, firstly, calcined at a temperature of about 600 to 1000° C. to burn out the binder, and then annealed at a temperature of 1700 to 2000° C. under a nitrogen pressure of 1 to 200 atmospheres. At this time, it is important with a view to realizing high strength and low thermal conductivity simultaneously for the sintered specimen to have a relative density within the range of 70 to 90% and a microstructure with elongated grains developed from seed crystals being complicated.

The thus obtained porous silicon nitride ceramics having high strength and low thermal conductivity according to the present invention have a microstructure with elongated grains being complicated developed from seed crystals oriented parallel to the casting plane and fine pores of about several microns sealed among the elongated grains. Since the thermal conductivity of the specimen is lowered due to the introduction of pores, the elongated grains are oriented parallel to the casting plane and the introduced pores are small and dispersed without being connected with one another, high strength of the product is exhibited in the direction vertical to the orientation direction of the grains.

According to the present invention, porous silicon nitride ceramics having high strength and low thermal conductivity with a theoretical density of less than 85% and strength of more than 700 MPa in the direction vertical to the orientation direction of grains can be obtained.

Figure 2:
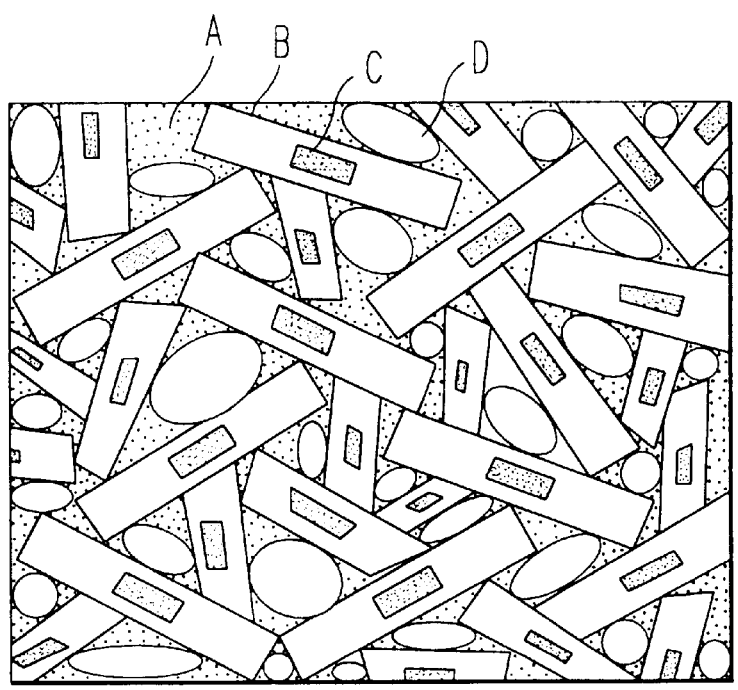
FIG. 2 shows a schematic view of the microstructure of a porous silicon nitride sintered body having high strength and low thermal conductivity obtained according to the present invention.

A schematic view of the microstructure of a silicon nitride sintered body (Comparative Example) having high strength and high toughness with a small amount of seed crystals added thereto (5 volume %) is shown in FIG. 1. The microstructure of silicon nitride ceramics obtained according to the present invention is shown in FIG. 2.

In Comparative Example, the amount of seed crystals added is small and hence the obtained sintered body is dense and has a microstructure with large elongated grains developed from seed crystals as nuclei oriented among fine silicon nitride matrix particles parallel to the casting plane. Similarly, in the present invention, large elongated grains developed from seed crystals are oriented among fine silicon nitride matrix particles parallel to the casting plane and dispersed. However, since the amount of seed crystals added is large, the large elongated grains come into contact with one another during sintering, and the region surrounded with the large elongated grains is prevented from being densified and this part becomes pores finally, realizing a microstructure with spherical pores dispersed as shown in FIG. 2 schematically.

EXAMPLES

Hereafter, the present invention will be described specifically according to Examples.

Example 1

(1) Preparation of a Formed Body with Rodlike beta-Silicon Nitride Single Crystals Oriented Parallel to the Casting Plane To 30 g of an alpha-$Si_3N_4$ raw powder having a specific surface area of 2 $m^2$ were added 2.418 g of $Y_2O_3$ and 1.288 g of $SiO_2$, and the mixture was planetary-milled with methanol as a dispersion medium using a silicon nitride ball and a pot. Then the methanol was removed by a vacuum evaporator; the resultant product was dried at 120° C. under vacuum and allowed to pass a 60-mesh sieve to obtain a compound for preparing seed crystals. The compound was put into a silicon nitride crucible and heated at 1850° C. for 2 hours under a nitrogen pressure of 5 atmospheres; the obtained aggregate was further pulverized to a 60-mesh size.

The thus obtained powder was treated with an aqueous mixed solution of hydrofluoric acid and nitric acid (hydrofluoric acid/nitric acid/water=45/5/50 volume %), sulfuric acid, dilute hydrofluoric acid and ammonia water in order, and $Y_2O_3$ and $SiO_2$ as glass phase components were removed to obtain rodlike beta-silicon nitride single crystals with a short diameter of 1.4 $\mu$m and an aspect ratio of 4. The seed crystals had an extremely high purity with the oxygen content of less than 0.26% and the yttrium content of less than 1.3 ppm.

(2) Preparation of a Porous Silicon Nitride Sintered Body Having sigh Strength and Low Thermal Conductivity The compounding of materials in the present Example is as follows:

(i) Compounding: alpha-$Si_3N_4$+5 weight % of $Y_2O_3$+2 weight % of $Al_2O_3$+10 volume % of rodlike silicon nitride single crystals (short diameter of the rodlike silicon nitride single crystals: 1.4 $\mu$m, long diameter: 5.6 $\mu$m)

To an alpha-$Si_3N_4$ raw powder (specific surface area: 10 $m^2$/g, average diameter: 0.1 $\mu$m) were added $Y_2O_3$ and $Al_2O_3$ as sintering additives and 3 weight % of a dispersing agent (Diamine RRT manufactured by Kao Corporation, JP), and the mixture was planetary-milled with a mixed solvent of toluene and butanol (toluene: 80 volume %, butanol: 20 volume %) as a mixing medium, employing a silicon nitride ball and a pot, for 3 hours.

Ten volume % of the above seed crystals were added to the above obtained slurry and mixed employing a resin pot and a resin coat ball for 24 hours; furthermore, 9 weight % of a binder (polyvinyl butyral resin) and 2.25 weight % of a plasticizer (dioctyl adipate) were added to the powder and the mixture was mixed for 48 hours. The thus obtained slurry was formed into a green sheet with a thickness of 150 $\mu$m according to the doctor-blade method.

As a result of observing the green sheet by a scanning electron microscope, it was found that the seed crystals in the sheet were oriented parallel to the casting direction. The green sheets were punched into a rectangular shape of 45×50 mm, and 50 thereof were stacked at 130° C. under a pressure of 70 kg/$cm^2$ uniaxially. The stacked sheets were calcined at 600° C. in a flow of a 95% $N_2$ and 5% $H_2$ gas mixture to burn out the organic binder. The calcined body was set in a carbon crucible, covered with an $Si_3N_4$ powder, and maintained at 1850° C. for 6 hours under a nitrogen pressure of 9 atmospheres to obtain a sintered body.

(3) Characteristics of the Sintered Body

In order to measure the density and strength of the specimen, a specimen of 3×4×40 mm was cut from the obtained sintered body so that the sheet casting direction should be corresponded with a longish direction of the specimen. The obtained specimen was ground with a #4 dia wheel, and then the measurement of the density thereof and the measurement of four-point flexural strength at room-temperature according to JIS R-1601 were performed. In addition, a disk-like specimen with a diameter of 10 mm and a thickness of 2 mm was cut from the sintered body and the thermal conductivity thereof was measured at room temperature by a laser flash method.

Figure 3:
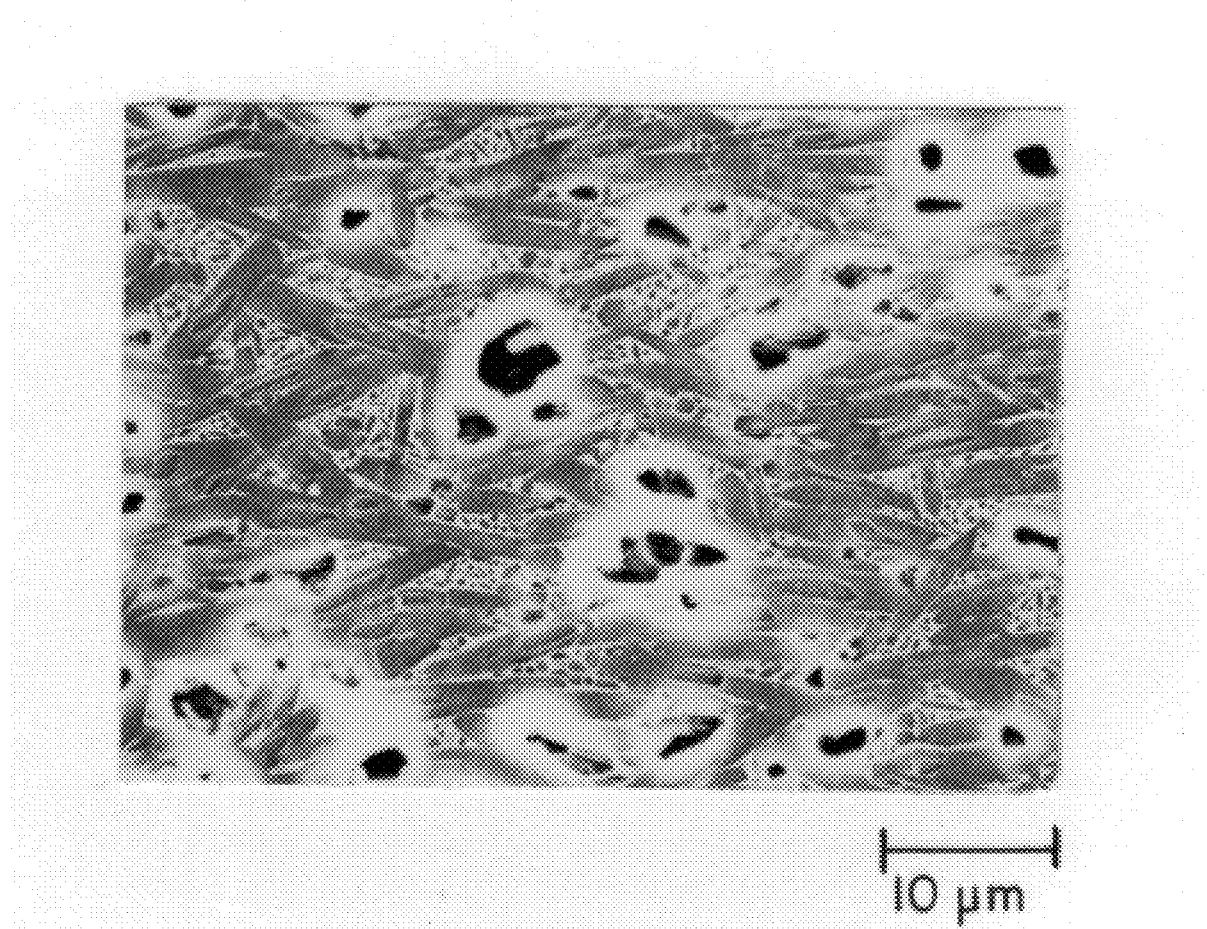
FIG. 3 shows an electron microscope photograph (×2000) of the polished and etched surface of porous silicon nitride ceramics having high strength and low thermal conductivity obtained according to the present invention. Besides, the surface of them parallel to the sheet casting plane was observed.

Moreover, after the specimen was mirror-polished, it was subjected to a plasma-etching treatment in $CF_4$ gas and the microstructure thereof was observed. An electron microscope photograph (×2000) of the polished and etched surface of the above sintered body is shown in FIG. 3.

The density in Table 1 means relative density (%) on the basis of theoretical density.

For comparison, a sintered body with no seed crystal added thereto and a formed body with seed crystals only mixed therewith were prepared by an ordinary pressing method and sintered at 1850° C. for 6 hours under a nitrogen pressure of 9 atmospheres similarly; the results of evaluating the obtained sintered bodies are also shown in Table 1.

microstructure with large elongated grains oriented parallel to the casting plane and complicated and spherical pores hardly coming into contact with one another, it has high strength of more than 700 MPa in the direction vertical to the orientation direction of the grains even though it has a theoretical density of less than 85%.

Besides, low thermal conductivity of the body is realized and thermal conductivity of it is lowered by the introduction of more than 15% of pores. It is possible to further lower the thermal conductivity of it by dissolving alumina into silicon nitride as a matrix to make a solid solution, a sialon.

Moreover, porous silicon nitride ceramics having low thermal conductivity according to the present invention are useful as a high-temperature heat insulating component, for example, as a material for heat-shielding engine parts and diesel engine parts.

What is claimed is:

1. A method for producing a porous silicon nitride sintered body having high strength and low thermal conductivity, which comprises:

adding more than 10 volume % of rodlike beta-silicon nitride single crystals with a larger mean diameter than that of a silicon nitride raw powder to a mixture

TABLE 1

| | | | Seed crystals | Characteristics of Sintered Bodies | | |
|---|---|---|---|---|---|---|
| | Method of forming | Sintering additive | Amount added (volume %) | Density (%) | Strength (MPa) | Thermal conductivity (W/mK) |
| Comp. Ex. 1 | Mold pressing | 5 wt. % $Y_2O_3$, 2 wt. % $Al_2O_3$ | Not added | 99.3 | 1000 | 30 |
| Comp. Ex. 2 | " | " | 5 | 97.5 | 760 | 35 |
| Comp. Ex. 3 | " | " | 10 | 88.0 | 350 | 27 |
| Example 1 | Sheet laminating | 5 wt. % $Y_2O_3$, 2 wt. % $Al_2O_3$ | 10 | 90.0 | 950 | 25 |
| Example 2 | " | " | 15 | 84.0 | 720 | 20 |

Note: All specimens were sintered at 1850° C. for 6 hours under a nitrogen pressure of 9 atmospheres.

The obtained sintered body had relative density of 90%, four-point flexural strength of 950 MPa and thermal conductivity of 25 W/mK.

Example 2

The compounding of materials in the present Example is as follows:

(ii) Compounding: alpha-$Si_3N_4$+5 weight % of $Y_2O_3$+2 weight % of $Al_2O_3$+15 volume % of rodlike silicon nitride single crystals (mean diameter of the rodlike silicon nitride single crystals: 1.4 μm, mean length: 5.6 μm)

A sintered body was prepared in the same manner as in Example 1 except the above compounding of materials.

The obtained sintered body had relative density of 84%, four-point flexural strength of 720 MPa and thermal conductivity of 20 W/mK.

As described in detail above, according to the present invention, a silicon nitride sintered body having high strength and low thermal conductivity can be obtained.

A silicon nitride sintered body prepared according to the present invention exhibits high strength; since it has a comprising said silicon nitride raw powder and a sintering additive, preparing a formed body with rodlike beta-silicon nitride single crystals oriented parallel to a casting plane by a forming technique selected from the group consisting of sheetcasting and extrusion forming, sintering said formed body to develop elongated silicon nitride grains from the added rodlike beta-silicon nitride single crystals as nuclei, and obtaining a sintered body with the elongated grains being dispersed in a complicated state, wherein said sintered body has a relative density of 70 to 90%; and said sintered body has a thermal conductivity of 25 W/mK or less.

2. The method as claimed in claim 1, wherein said sintered body comprises pores formed by allowing said elongated grains to collide with one another to prevent the densification of a region surrounded by said elongated grains.

* * * * *